United States Patent [19]

Alexander

[11] Patent Number: 5,360,619
[45] Date of Patent: Nov. 1, 1994

[54] CEREAL FOOD INGREDIENTS FROM WAXY BARLEY

[75] Inventor: Donald J. Alexander, Martin, N. Dak.

[73] Assignee: Alexander - Peterson, Inc., Martin, N. Dak.

[21] Appl. No.: 131,100

[22] Filed: Oct. 1, 1993

[51] Int. Cl.$^5$ ............................................. A23L 1/00
[52] U.S. Cl. ............................... 426/242; 426/462; 426/507; 426/622
[58] Field of Search ............... 426/242, 462, 507, 520, 426/622

[56] References Cited

U.S. PATENT DOCUMENTS

| | | | |
|---|---|---|---|
| 4,311,714 | 1/1982 | Goering et al. | 426/28 |
| 4,555,409 | 11/1985 | Hart | 426/242 |
| 4,737,371 | 4/1988 | Bookwalter | 426/462 |
| 4,804,545 | 2/1989 | Goering et al. | 426/430 |
| 4,939,346 | 7/1990 | Bailey et al. | 219/388 |
| 5,023,429 | 6/1991 | Bailey et al. | 219/388 |
| 5,024,145 | 6/1991 | Bailey et al. | 99/451 |
| 5,024,996 | 6/1991 | Ringe | 426/620 |
| 5,063,078 | 11/1991 | Foehse | 426/618 |
| 5,151,283 | 9/1992 | Foehse et al. | 426/620 |
| 5,151,285 | 9/1992 | Williams et al. | 426/242 |
| 5,164,013 | 11/1992 | Posner et al. | 426/622 |
| 5,186,968 | 2/1993 | Wellman | 426/622 |

OTHER PUBLICATIONS

R. S. Bhatty, B-Glucan Content and Viscosities of Barleys and Their Rollermilled Flour and Brand Products, 1992.

*Primary Examiner*—George Yeung
*Attorney, Agent, or Firm*—Patterson & Keough

[57] ABSTRACT

Methods are disclosed for producing barley food ingredients, comprising the steps of pearling, tempering and stabilizing grain from barley lines having the waxy phenotype, and thereafter forming the grain into a cereal ingredient. Pearling the grain may comprise removing from about 5 weight percent to about 15 weight percent of the bran and germ. Tempering may comprise achieving a moisture content of about 12% to about 16% in about 2 to about 3 hours. Stabilizing the grain may comprise heating the grain in a bulk material radiation processor, preferably to a temperature between about 235 and 260 degrees Fahrenheit for a time between about 1 and about 7 minutes. Cereal ingredients may be formed by rolling the grain to a flake thickness from about 0.007 to about 0.030 inches. Barley food ingredients and compositions are disclosed, including cereals and snack foods.

22 Claims, No Drawings

CEREAL FOOD INGREDIENTS FROM WAXY BARLEY

FIELD OF THE INVENTION

This invention relates to food ingredients made from barley. More particularly, the invention relates to processing waxy barley grain by steps comprising pearling, tempering, and stabilizing. The invention also relates to waxy barley food ingredients and to compositions made therefrom.

1. Background of the Invention

Barley (*Hordeum vulgare* L.) is a small grain cereal that is grown worldwide. Cultivated barley is a naturally self-fertilizing species, although there is a small percentage of cross-fertilization. By artificial hybridization and careful selection for the desired phenotype, a breeder can develop pure lines that are uniform in growth habit, maturity, yield, and other morphological characters. Pure lines will generally breed true-to-type. However, individual pure lines may differ from each other in one or more traits and can be classified and differentiated according to the specific traits they possess. For example, there are types of barley known as two-rowed and other types known as six-rowed. Barley lines also can be classified as spring barley or winter barley, referring to the growth habit of plants of that line, or by the presence or absence of hulls on the seed. There are, of course, many other traits which differentiate the various lines. A discussion of breeding methods for developing barley lines and of some traits in barley can be found in Foster, A. E., *Barley*, pp. 83–125, in Fehr, W. R., ed., *Principles of Cultivar Development Vol. 2 Crop species*. Macmillan, New York (1987).

Once a breeder has developed a pure line, it may be given a unique name and released as a cultivar under that name. Named cultivars are not necessarily pure lines and may be a mixture of genotypes or even be a hybrid. At present however, most named cultivars are pure lines.

Most of the barley grain produced in the United States is used as an ingredient in cattle, pig, or poultry feed. Another major use for barley is malt production. Malt is used in the brewing and distilling industries to produce alcoholic beverages. Certain lines of barley have properties that are preferred for producing malt. Some of these characteristics include kernel plumpness, total malt protein, soluble protein, diastatic power, and alpha-amylase content. Barley gram that has more than about 13.5 wt. % protein on a dry basis is rejected by malting plants. Barley grain that is too dark in color is also rejected by malting plants.

Some barley is used as a food ingredient for humans or household pets. When used as a food ingredient, the barley grain is generally processed. Tempering is a step whereby the moisture content of the grain is adjusted to facilitate subsequent processing steps. Other processing steps may include grinding the grain to produce flour, or rolling to produce thick rolled or flaked grain. A commonly used processing step known as pearling removes at least a substantial portion of the bran and the germ to produce a pearled barley grain, such that at least about 5 to about 40 wt. % of the grain is removed. When lower weight percentages are removed, the pearled kernels are substantially unreduced in size and have a whitish color and rounded ends. When higher percentages of the kernel weight are removed, the pearled kernels are somewhat reduced in size, are whiter in appearance and are much more rounded.

Cooking is a processing step that is often performed on barley grain, either alone or in combination with other processing steps such as pearling. Cooking generally involves heating the barley grain in water until the grain has softened to the degree desired by the processor or by the final consumer. The result of the heating process is a cooked barley food ingredient. Barley is cooked in order to make it easier to chew, to improve digestibility and to improve the flavor.

A type of barley known as waxy barley has been developed in recent years. Lines having the waxy phenotype have reduced amounts of amylose starch in the seed. The trait is conditioned by the recessive wx allele at the waxy genetic locus. The waxy trait may be useful in the production of high maltose syrup from barley. Goering, K. J., et al., *Starke* 32-349–352 (1981). Certain barley lines also carry the hulless trait, sometimes called the nude trait. This trait is conditioned by the recessive n allele. Barley lines carrying the hulless trait actually do produce a hull. However, because the hull loosely covers the seed rather than being cemented to it, the hull is easily removed during harvesting operations; the harvested grain is essentially hulless.

It is customary to have barley grain present in certain foods such as canned soups, and consumers expect it to be present when they purchase these items. Nevertheless, grains other than barley are generally more prevalent in foods such as hot cereals, breads, ready-to-eat cereals and snack foods.

One factor deterring the use of barley in more foods is that barley grain often requires long processing times in order to manufacture cereal ingredients suitable for incorporation into food compositions, or as a hot or ready-to-eat cereal. Barley food ingredients generally require extended cooking times, either by the food processor or by the final consumer, in order to soften the grain. It would be desirable to have barley food ingredients possessing shorter processing times.

Another factor affecting the use of barley food ingredients is that more attention has been directed towards traits related to the use of barley as an animal feed, rather than the use as a human food. For example, increased protein and decreased fiber have been proposed as desirable characteristics to develop in barley for animal feed. Foster, A. E., *Barley*, p. 122, supra. In contrast, a high fiber content in hot and ready-to-eat cereal products, particularly the soluble dietary fiber fraction, is often considered by the consumer to be a positive feature of the cereal. Barley food ingredients having, in general, more desirable taste attributes may increase the prevalence of barley food ingredients in cereal products. Moreover, there may be a price advantage for barley grain used to form cereal ingredients having improved taste attributes.

SUMMARY OF THE INVENTION

A method for producing a barley food ingredient is disclosed, comprising the steps of pearling barley grain having a waxy phenotype, contacting the waxy barley grain with water until a moisture content of between about 12 and about 16% is achieved in less than about 5 hours at room temperature, stabilizing the waxy barley grain at a temperature of between about 235° and about 260 degrees Fahrenheit for a time between about 1 and about 7 minutes, and then forming the waxy barley grain into a cereal ingredient.

The waxy barley grain may have either a hulless or hulled phenotype. The pearling step for grain from waxy, hulless barley lines may comprise removing between about 5 and about 10 weight percent of the grain. The pearling step for grain from waxy, hulled barley lines may comprise removing between about 10 and about 15 weight percent of the grain.

The step of contacting the waxy barley grain with water may comprise achieving a moisture content of about 12% to about 16% in about 2 to about 3 hours at room temperature.

The stabilizing step may comprise heating the barley grain with an infrared heating apparatus. The infrared heating apparatus may comprise a bulk material radiation processor. Stabilizing conditions may comprise heating the barley grain to a temperature between about 235 and 245 degrees Fahrenheit for a time between about 1 and about 3 minutes, or may comprise heating the barley grain to a temperature between about 235 and 245 degrees Fahrenheit for about 2 minutes.

The step of forming a cereal ingredient may comprise rolling the barley grain to an average thickness of between about 0.007 inches and about 0.030 inches. Rolling may be carried out to an average thickness of between about 0.007 inches and about 0.012 inches, an average thickness of between about 0.013 inches and about 0.024 inches, or an average thickness of between about 0.025 inches and about 0.030 inches. Alternatively, the step of forming a cereal ingredient may comprise puffing the waxy barley grain with a puffing gun.

Barley food ingredients are disclosed, produced by pearling barley grain having a waxy phenotype, contacting the waxy barley grain with water until a moisture content of between about 12 and about 16% is achieved in less than about 5 hours at room temperature, stabilizing the waxy barley grain at a temperature of between about 235 and about 260 degrees Fahrenheit for a time between about 1 and about 7 minutes, and then forming the waxy barley grain into a cereal ingredient. In an alternative embodiment, the step of contacting the waxy barley grain with water may take place for about 2 to about 3 hours at room temperature to achieve a moisture content between about 12 and about 16%. In an alternative embodiment, the stabilizing step comprises heating the waxy barley grain in a bulk material radiation processor at a temperature between about 235 and about 245 degrees Fahrenheit for a time between about 1 and about 3 minutes. In an alternative embodiment, the step of forming a cereal ingredient may comprise puffing the waxy barley grain with a puffing gun, or may comprise rolling the waxy barley grain to an average thickness of between about 0.007 inches and about 0.030 inches.

Compositions comprising such barley food ingredients incorporated into foods are disclosed.

DETAILED DESCRIPTION OF THE INVENTION

Barley food ingredients are used alone or in combination with other ingredients to form cereals of various kinds. Cereal products having barley food ingredients are not as prevalent as cereal products made from wheat, oat, and/or rice. The applicant has made the surprising discovery that grain from a barley line having the waxy phenotype and processed by the novel methods disclosed herein, forms flavorful hot cereal and ready-to eat cereal products. Furthermore, compositions incorporating barley food ingredients of the invention may be made that have a desirable flavor and texture. The methods of the invention provide advantages such as shortened processing time and decreased processing expense to the manufacturer. These and other features will be apparent from the description and examples explained below.

Barley lines suitable for the invention are, for example, the barley lines Wanubet, Bob, Don and Antelope. Don is a waxy, hulled line, whereas Wanubet, Bob and Antelope are waxy, hulless lines. The varieties named above are adapted for growing in west central North Dakota, eastern Montana, Saskatchewan and Alberta, although they may possess agronomic characteristics that make them suitable for growing in other areas. However, it is expected that any barley line possessing the waxy phenotype is suitable for practicing the invention.

Waxy barley grain is harvested at maturity in any manner suitable for the geographic area and farm land where the particular barley line is grown. The grain may be stored in the manner typical for barley, with reference to the fact that moisture and high temperatures are detrimental to the grain.

According to the present invention, waxy barley grain may be processed by steps comprising pearling, tempering, stabilizing and forming cereal ingredients. The pearling step may be carried out in a pearling machine of either the vertical or horizontal type. Parameters such as dam height, exit vane angle, mill speed and so forth, will be set in the usual manner known to those skilled in the art, provided that the process removes at least a sufficient portion of the germ and the bran to achieve a white color in the grain. Removal of about 5 to about 10 wt. % of the grain is generally sufficient for grain from a barley line having the waxy, hulless phenotype. For grain from a barley line having the waxy, hulled phenotype, about 10 to about 15 wt. % of the grain is preferably removed. Pearled barley grain may be passed through the pearling machine a second time to produce double-pearled grain, wherein at least about 35 to 42 wt. % of the grain is removed. Double pearling produces a somewhat whiter grain, which is desired for some food compositions. However, double pearling adds the additional costs of a second pass through a pearling machine and increases the amount of grain that is lost as waste.

Additional, optional steps may be combined with the method of the present invention. For example, grain with unacceptable levels of weed seeds, chaff, or other foreign matter may be cleaned by regular air and gravity cleaning equipment prior to pearling, in order to remove all foreign matter.

The pearled barley grain is thereafter tempered, i.e., contacted with water for a period of time, which hydrates starches and other grain components for subsequent processing steps. It is generally desirable to temper the grain prior to stabilization if the moisture is less than 11%. If the moisture of the incoming grain is already greater than 11% without tempering, then the grain may or may not be tempered as desired. Tempering brings the moisture content of the grain to between about 12 and about 16 wt. %, preferably to about 13 to 14 wt. %, and may be accomplished by either soaking the grain in water or by spraying the grain with water. A preferred tempering step comprises spraying the grain with a spray nozzle as the grain moves through an "air tube". The time required for the tempering step will depend to some extent upon the quality of the incoming grain as well as the initial moisture content of the grain. Grain quality involves such factors as protein content, ratio of plump vs. shrunken kernels, and volume of waxy starch. Grain quality will vary from year to year, depending upon growing conditions, and will vary depending upon the geographic area in which the grain was grown. The fact that such factors affect grain quality is well known in the art, and will be taken into account by the skilled artisan when performing the tempering step.

Grain from barley having the waxy phenotype unexpectedly has been found to require a significantly shorter tempering time than normal (non-waxy) barley grain. Pearled, waxy grain is tempered for about 2 to about 5 hours at room temperature, preferably for less than about 4 hours, more preferably for about 2 to about 3 hours, until a moisture content of about 12 to about 16%, preferably 13 to 14%, is achieved. It is thought that the short tempering time results in less degradation of the starch in the grain, improving the flavor of food ingredients made therefrom. A period of tempering more than about 5 hours at room temperature may lead to noticeable off-flavors in food ingredients made from waxy barley.

Tempering is generally carried out at room temperature, i.e., at the ambient temperature of the facility in which the tempering step is carried out. This temperature may vary as the room is heated or cooled during different seasons, but is generally maintained at a temperature of between 60 to 85 degrees Fahrenheit, often in the range of 70 to 75 degrees Fahrenheit, to provide comfortable working conditions. However, it is apparent that deliberately increasing the temperature of the room or of the tempering apparatus can decrease the tempering time. Conversely, decreasing the temperature of the room or of the tempering apparatus can increase the tempering time. Deliberate alterations in the temperature at which the waxy barley grain is tempered are within the scope of this invention.

The moisture content during tempering may be monitored by standard moisture test equipment such as a Dickey-John Model 707 moisture tester (Dickey-John Corp., Auburn, Ill.). Tempering will be stopped when moisture has penetrated the kernels evenly.

The pearled, tempered barley grain is thereafter subjected to a stabilization step (partially cooking and drying the grain). A preferred method of stabilization is irradiation of the grain with an infrared heating apparatus, for example, a bulk material radiation processor. An example of such an apparatus is disclosed in U.S. Pat. No. 5,024,145, incorporated herein in its entirety by reference. The grain generally is irradiated at a temperature between about 235 and 260 degrees Fahrenheit and maintained at that temperature for between about 1 and about 7 minutes. A preferred temperature and time range for the stabilization step is about 235 to about 260 degrees Fahrenheit and about 1 to about 3 minutes.

Stabilized grain has a significantly longer shelf life than unstabilized grain. Stabilization also affects the appearance, texture and other attributes of the grain. By proper choice of stabilizing conditions such as temperature and time, these attributes can be optimized for the overall taste of the final food ingredient. For example, a stabilization temperature of about 270° Fahrenheit may provide an attractive light roast appearance and a slight burnt taste in the product. In contrast, a stabilization temperature of about 240° Fahrenheit may have an attractive appearance without a noticeable burnt taste in the product.

Pearled, tempered, stabilized grain is formed into a cereal ingredient suitable for use as a hot cereal or for incorporation into a food. For example, such grain may be formed into a puffed cereal ingredient by a puffing gun machine. Alternatively, the grain may be processed by rolling or flaking in a roller mill, operated in the manner known to those skilled in the art, to make flakes of a desired thickness. Flakes from about 0.007 to about 0.024 inches in average thickness may be used to make various hot cereal products. Thinner flakes provide a desirable texture and mouthfeel in hot cereals that is not provided by thicker flakes. On the other hand, flakes from about 0.018 to about 0.030 inches in average thickness are generally preferred for food compositions such as granola bars, candy bars and ready-to-eat cereals.

The rolling or flaking step may further include kibbling the flakes into smaller pieces with steel cutters. The size of the kibbled grain affects the texture and mouthfeel of the end product, and may be adjusted to achieve the desired results. For example, the rolled grain may be scored to make corrugated flakes, or a differential speed roller may be used to make a curled flake.

It is preferable for the rolling step to take place immediately after the stabilization step. It is believed that rolling immediately after stabilization contributes to the drying process, since the rolled grain is still at a high temperature after stabilization.

In a preferred embodiment, grain from a waxy, hulless barley line is pearled to remove about 10 wt. % of the grain, tempered for about 2 hours at room temperature to achieve a moisture content of about 13 to 14%, stabilized with a bulk material radiation processor at about 240 degrees Fahrenheit for 3 minutes, and flaked immediately after stabilization to a flake thickness between about 0.013 and 0.017 inches, with an average flake thickness of 0.015 inches. The flakes are kibbled with steel cutters to an average area of 0.125 square inches.

Preferred embodiment flakes are a food ingredient suitable for use as a hot cereal. Barley food ingredients of the preferred embodiment are cooked in quantities of about 1 to 4 servings, i.e., 45 to 180 grams of cereal for about 1 minute or less. Preferred embodiment food ingredients have a smooth, creamy texture and mouthfeel, with little or no grainy taste. It is believed that barley food ingredients having an average thickness of about 0.015 are preferably cooked in small quantities because the thinness of the flakes may cause uneven mixing in quantities larger than about 250 grams. A 45 gram serving of the preferred embodiment cereal provides 3 gm of soluble dietary fiber.

In a second embodiment of the invention, grain from a waxy, hulless barley is pearled to remove about 10 wt. % of the grain, tempered for about 2 hours at room temperature to achieve a moisture content of about 13 to 14%, stabilized with a bulk material radiation processor at about 240 degrees Fahrenheit for 3 minutes, and flaked to between about 0.018 and 0.022 inches, with an average flake thickness of 0.020 inches. The flakes are kibbled to an average area of 0.1875 square inches.

The resulting second embodiment flakes are a food ingredient suitable for use as a hot cereal. An amount between about 800 grams and 1200 grams of such a product is substantially completely cooked in about 3 minutes. After cooking quantities of about 800 grams for about 3 minutes, a second embodiment cereal will retain a sufficiently pleasing texture, flavor, and appearance to be edible for at least 45 minutes when maintained at a constant serving temperature of 100 degrees Fahrenheit, which time and temperature are typical of serving conditions in institutional food services, e.g., cafeterias, hospitals, and the like. Such a cereal will not acquire a "mushy" texture as a result of extended periods of time al an elevated temperature.

It is contemplated that other barley food ingredients having a creamy texture and mouthfeel, and cookable in a short period of time may be made by processes of the invention. For example, it is contemplated that flakes having an average thickness of less than about 0.010 inches will make a barley food ingredient suitable for use as a baby food cereal.

In a third embodiment of the invention, waxy, hulled grain is pearled to remove about 15 wt. % of the grain, tempered for about 2 hours at room temperature to achieve a moisture content of about 13 to 14%, stabilized with a bulk material radiation processor at about 240 degrees Fahrenheit for 2 minutes, and flaked immediately after stabilization to a thickness of between about 0.020 and 0.030 inches to make a ready-to-eat food ingredient. The flakes are kibbled with steel cutters to an average area of 0.25 square inches.

Various modifications to the flake thickness and flake area may be made in order to obtain optimum texture, appearance, and/or other attributes desired by a manufacturer of a food composition. For example, larger size flakes about 0.020 to about 0.030 inches in thickness may be toasted in a Proctor-Schwartz oven to make an ingredient having a crunchy texture, and suitable for inclusion in a ready-to-eat cereal.

The barley food ingredients of the invention are suitable for incorporation into compositions such as a granola bar snack food. Snack food compositions may contain up to 50% by weight of a barley food ingredient. The remainder of the composition may comprise other ingredients as desired by the manufacturer, e.g., sugar, oil, corn syrup, chocolate, fruit, lecithin, stabilizers, nuts and the like. Compositions having barley food ingredients incorporated therein may contain flavoring ingredients, including malt syrup, natural and artificial flavorings such as banana, or tropical fruit flavorings, and the like.

Several methods, such as microwave cooking and stovetop cooking, may be used to cook the ingredients and compositions of the present invention. Any method is suitable which accomplishes the cooking of those barley food ingredients and compositions that are intended for cooking.

The invention will be further understood with reference to the following illustrative embodiments, which are purely exemplary, and should not be taken as limiting the true scope of the present invention as described in the claims.

EXAMPLES

Example 1. Varietal Comparison of Waxy Barley Lines

Waxy, hulless lines named Bob and Wanubet, and a waxy, hulled line named Don, were compared to a normal (non-waxy), hulled line named Bowman.

Bob is derived from a cross of North Dakota lines ND 187-636-2 and ND 187-631-10. Line ND 187-636-2 is homozygous recessive for the n allele which conditions the hulless phenotype. Line ND 187-631-10 is homozygous for the recessive wx allele which conditions the waxy starch phenotype. Both ND 187-636-2 and ND 187-631-10 are near isogenics of the line Bowman. F2 seed possessing the waxy phenotype were advanced. In the F3 generation, seed having the waxy, hulless phenotype and also having morphological and physiological similarity to Bowman were selected for advancement. Waxy, hulless seed closely matching Bowman were advanced for 3 more generations and the resulting line was named Bob. About 30% of the Bob plants have intense red pigmentation of the stem, a trait derived from ND 187-636-2. Further, 5 to 10% of the plants have zebra striping on the lower leaves, a trait derived from ND 187-631-10. Bob germinates more quickly than Bowman under some field conditions, generally leading to emergence 3 to 4 days earlier than Bowman.

Don is derived from a cross of North Dakota line ND 187-631-10 with the cultivar Bowman. ND 187-631-10 is homozygous for the recessive wx allele and displays the waxy starch phenotype. After repeated backcrossing to the Bowman parent, a line having the waxy gene introgressed into the Bowman genetic background was obtained. The zebra stripe trait was also introduced into the Bowman background during the breeding process. This trait, which confers white zebra stripes on the lower leaves, is conditioned by the recessive zb allele present in ND 187-631-10. Don has, in general, the characteristics of Bowman with the addition of the wx and the zb genes. Because Don has similar morphological and agronomic characteristics to Bowman, Don can be grown in the same general geographic areas suitable for Bowman. Don germinates more quickly than Bowman under some field conditions, generally leading to emergence 3 to 4 days earlier than Bowman.

The Antelope line is a reselection of the waxy, hulless line Wanubet, with non-waxy and late, tall types selected against. Seed from the Wanubet line normally sold in commerce has a low percentage of non-waxy, late, tall, or other offtype seed present. Antelope will therefore produce a more uniform grain at harvest compared to Wanubet. Antelope has similar agronomic characteristics to Wanubet except that it is about 2 days earlier in maturity and is about 3 centimeters shorter than Wanubet.

The data in Table 1 provide a comparison of three barley lines with the waxy phenotype to the Bowman line having a normal starch phenotype.

TABLE 1

| Varietal Comparison Data* | | | | | |
| --- | --- | --- | --- | --- | --- |
| VAR | GRTHBT | SPIKE | COLCLR | LVEBOT | 1STFLB |
| Don | Spring | 2-rowed | Green | Green | Upright, waxy, not curled |
| Bob | Spring | 2-rowed | Green | Green | Upright, waxy, not curled |
| Wanubet | Spring | 2-rowed | Green | Green | Upright, waxy, not curled |
| Bowman | Spring | 2-rowed | n/d$^e$ | Dark Green | Semi-erect, waxy |
| VAR | 1STFLW | 1STFLL | AUR | BASLS | TOH |

TABLE 1-continued

Varietal Comparison Data*

| | | | | | |
|---|---|---|---|---|---|
| Don | 1.2 cm | 240 mm | white, yes | yes, white[a] | midseason |
| Bob | 1.2 cm | 240 mm | white, yes | yes, purple[b] | midseason |
| Wanubet | 8 cm | 300 mm | white, yes | yes, white[c] | midseason |
| Bowman | 1.2 cm | 230 mm | n/d | yes, white[a] | n/d |

| VAR | STMCLR | STMSTR | STMNCK | STMCLL | STMEXS |
|---|---|---|---|---|---|
| Don | white | mod. stiff | straight | closed | intermed. |
| Bob | white | mod. stiff | straight | closed | intermed. |
| Wanubet | white | weak | straight | closed | intermed. |
| Bowman | n/d | n/d | straight | closed | n/d |

| VAR | PLTHTAV | PLTHTRG | SPKSHP | SPKDEN | SPKPOS |
|---|---|---|---|---|---|
| Don | 80 cm | 60–95 cm | fusiform | lax | erect |
| Bob | 80 cm | 60–95 cm | fusiform | lax | erect |
| Wanubet | 82 cm | 60–100 cm | fusiform | lax | nodding |
| Bowman | n/d | n/d | fusiform | medium | lax erect |

| VAR | SPKLEN | SPKWAX | SPKHAR | SPKSTR | GLMLEN |
|---|---|---|---|---|---|
| Don | mid-long | waxy | few | 0–4% | ½ of kernel |
| Bob | mid-long | waxy | few | 0–4% | ½ of kernel |
| Wanubet | long | waxy | covered | 0–1% | ½ of kernel |
| Bowman | med. short | waxy | n/d | n/d | ½ of kernel |

| VAR | GLMHAR | GLMHLN | GLMALN | GLMASF | LEMTYP |
|---|---|---|---|---|---|
| Don | confined to band | long | equal | semismooth | long |
| Bob | confined to band | long | equal | semismooth | long |
| Wanubet | complete covered | long | equal | rough | long |
| Bowman | confined to band | long | equal | smooth | n/d |

| VAR | LEMASF | LEMTHN | LEMHAR | LEMSHP | LEMHRR |
|---|---|---|---|---|---|
| Don | semismooth | absent | absent | traverse-crease | long |
| Bob | semismooth | absent | absent | traverse-crease | long |
| Wanubet | rough | absent | absent | depression | long |
| Bowman | smooth | absent | present | n/d | long |

| VAR | KERTYP | KERWRN | KERLEN | AVGWT | ZEB |
|---|---|---|---|---|---|
| Don | covered | semi-wrinkled | 9.0–10.0 mm | 44 gm | 100% |
| Bob | naked | n/a[d] | 7.0–8.0 mm | 40 gm | 5–10% |
| Wanubet | naked | n/a | 7.0–8.2 mm | 32 gm | 0% |
| Bowman | covered | wrinkled | n/d | n/d | 0% |

| VAR | JUVHBT | WX | YIELD | | |
|---|---|---|---|---|---|
| Don | erect | waxy | 63 | | |
| Bob | semi-prostrate | waxy | 58.5 | | |
| Wanubet | erect | waxy | 72 | | |

TABLE 1-continued

Varietal Comparison Data*

| | | | |
|---|---|---|---|
| Bowman | n/d | normal | 72 |

*The terms used in the column headings in the Table, are defined as follows:
GRTHBT = Refers to the spring or winter growth habit for barley
SPIKE = Refers to the number of rows on the head; most barleys have either 2 or 6 rows.
COLCLR = The color of the coleoptile.
LVEBOT = Color of the plant leaves at the boot stage. Colors range from yellow-green to blue-green.
1STFLB = Morphology of the flag leaf at the boot stage. The morphology is upright or drooping, curled or not curled, and waxy, slightly waxy, or not waxy.
1STFLW = Average width of the first leaf below the flag leaf.
1STFLL = Average length of the first leaf below the flag leaf.
AUR = Color of the auricles and the presence or absence of pubescence. The color is generally either white or purple.
BASLS = Presence or absence of pubescence and the color of the basal leaf sheath at the seedling stage. The color is generally either white or purple.
TOH = Average time of heading. Time of heading is generally either early, midseason, or late.
STMCLR = Color of the stem, generally expressed as either white or purple.
STMSTR = Strength of the stem, generally expressed as either weak, moderately stiff, or stiff.
STMNCK = Shape of the stem neck generally expressed as either straight or snaky.
STMCLL = Shape of the stem collar generally expressed as either closed, open, or v-shaped.
STMEXS = Exsertion of the stem generally expressed as either slight, intermediate, or fully exserted.
PLTHTAV = The average height of the plant at maturity.
PLTHTRG = The range of the plant heights at maturity.
SPKSHP = The shape of the spike, generally either fusiform, oblong, or clavate.
SPKDEN = The density of the spike, generally either lax, lax to dense, or dense.
SPKPOS = The position of the spike at maturity, generally either erect, inclined, or nodding.
SPKLEN = Length of the spike at maturity, generally either short, mid-long, or long.
SPKWX = Waxiness of the spike, generally either waxy, slightly waxy or not waxy.
SPKHAR = Hairiness of the rachis edge, generally either lacking, few, or covered.
SPKSTR = The percentage of sterile spikelets and florets, ranging from 0% to 100%.
GLMLEN = The length of the glumes relative to kernel length, generally either $\frac{1}{3}$ as long, $\frac{1}{2}$ as long, or $>\frac{1}{2}$ as long.
GLMHAR = Hairiness of the glumes, generally either completely covered, confined to band, restricted to middle, or no hairiness.
GTLMHLN = Length of the hairs on the glumes, generally either long, short, or no hairs.
GLMALN = Length of the awn relative to glume length, generally expressed as less than, equal to, or more than the glume length.
GLMASF = Surface of the awns, generally expressed as smooth, semi-smooth, or rough.
LEMTYP = The type of lemma, generally expressed as either elevated hoods, sessile hoods, awnless on all rows, awnlets on central rows and awnless on lateral rows, short on central rows and awnlets on lateral rows, short (<length of spike), equal (equal length of spike), or long (>length of spike.).
LEMASF = Surface of awns (if any), generally expressed as smooth, semi-smooth, or rough.
LEMTHN = Number of teeth on the nerves of the lemma, generally expressed as absent, few, or numerous.
LEMHAR = Presence or absence of hairs on the lemma.
LEMSHP = Shape of the lemma at the base on the dorsal side, generally expressed as either depression, slight crease, or traverse crease.
LEMHRR = Length of the hairs on the rachilla, generally expressed as either short or long.
KERTYP = Type of kernel, generally expressed as either naked or covered. Naked kernels are the same as hulless kernels. The hulless phenotype is conditioned by the recessive n allele at the N genetic locus.
KERWRN = Morphology of the hull (if covered), generally expressed as either wrinkled, semi-wrinkled, slightly wrinkled.
KERLEN = Length of a typical kernel, generally expressed as either, short, short to mid-long, mid-long, mid-long to long, or long.
AVGWT = Average weight per 1,000 seeds.
ZEB = Percentage of zebra striping on the lower leaves, generally leaves 1 and 2. This trait generally is not seen on leaves above the third leaf. It results in white stripes running parallel to the axis of the leaf. The zebra striping phenotype is conditioned by the recessive zb allele at the Zb genetic locus.
WX = Presence or absence of waxy starch in the mature kernel, expressed as waxy or normal. The waxy phenotype results in a brown staining of the starch in a standard iodine test. The waxy phenotype is conditioned by the recessive wx allele at the waxy locus.
YIELD = Yield of grain expressed in bushels per acre. This number is an average from 4 years of testing for Don, 3 years of testing for Bob, 10 years of testing for Wanubet, and 8 years of testing for Bowman.
[a]Predominantly white with slight purple pigmentation.
[b]Predominantly white with slight purple pigmentation in 70% of the plants. Intense purple pigmentation in 30% of the plants.
[c]Predominantly white with very slight purple pigmentation.
[d]n/a = not applicable.
[e]n/d = not determined The composition of the grain from a waxy, hulless line and a waxy, hulled line are compared in Table 2. The data in this table show that both lines should be similar in the amount of soluble fiber they provide in food ingredients and food compositions.

TABLE 2

Analysis of Hulless and Hulled Waxy Barley Grain (dry basis)

| | Bob (hulless) | Don (hulled) |
|---|---|---|
| Dry Matter (%) | 90.20 | 88.40 |
| Crude Protein (%) | 14.48 | 15.57 |
| Beta-Glucans (%) | | |
| Total | 6.71 | 6.44 |
| Acid-Soluble | 6.01 | 5.17 |
| Acid Detergent Fiber (%) | 2.17 | 6.20 |
| Starch (%) | 69.70 | 63.55 |
| Non-Starch Polysaccharides (mg/gm) | | |
| Arabinose | 9.2 | 26.3 |
| Xylose | 13.9 | 92.4 |
| Mannose | 2.7 | 1.9 |
| Galactose | 0.2 | 2.8 |
| Glucose | 44.3 | 99.4 |
| Uronic Acids | 2.8 | 5.8 |

Example 2. Taste Comparison of Two Barley Hot Cereals

A barley hot cereal (Cereal 1) was made from grain of the waxy, hulless line Wanubet. The grain was pearled, tempered, stabilized and rolled under the conditions summarized in Table 3. The stabilization was effected in a bulk material radiation processor described in U.S. Pat. No. 5,024,145, incorporated herein by reference. The grain was rolled immediately after stabilization into flakes of between about 0.026 inches and about 0.022 inches in thickness and kibbled with steel cutters. A product essentially equivalent to Cereal 1 is NuGrain Quick Barley Cereal (NuGrain Technologies, Martin, N.D. 58758), available commercially since about January, 1992.

A second barley hot cereal (Cereal 2) was made from grain of the waxy, hulless line Wanubet. The grain was pearled, tempered, stabilized and rolled under the conditions summarized in Table 3, using a bulk material radiation processor described in U.S. Pat. No. 5,024,145. The grain was rolled immediately after stabilization into flakes of between about 0.013 inches and about 0.017 inches in thickness and kibbled with steel cutters.

TABLE 3

| Processing Conditions for Two Barley Hot Cereals | | |
|---|---|---|
| Step | Method 1 | Method 2 |
| Pearling (wt % removed from grain) | 10 | 10 |
| Tempering (hours) | 6–12 | 2 |
| Tempering Moisture (%) | 14–16 | 13–14 |
| Stabilization Temp. (°F.) | 270 | 240 |
| Stabilization Time (minutes) | 3–7 | 3 |
| Average Flake Thickness (inches) | 0.020–0.024 | 0.015 |
| Final Moisture (%) | 9 | 9 |

A blind product taste test was conducted with a panel consisting of 14 physically and mentally active senior citizens. All members of the panel were accustomed to eating hot cereals. Members of the panel were not compensated.

Cereal 1 was cooked by bringing water to a full boil on a stove top, and stirring in 28.4 gm of cereal per cup of water. The heat was turned off and the mixture was allowed to stand uncovered for 3 minutes. Previous taste evaluations had shown that Cereal 1 cooked by this procedure had the best consumer acceptance of all the cooking procedures tested.

Cereal 2 was cooked by bringing water to a full boil on a stovetop, and stirring in 45 gm of cereal per cup of water. The mixture was allowed to return to a boil, the heat was reduced, and the mixture allowed to simmer for 45 seconds.

Cereals were served hot from the pans, with milk, sugar, artificial sweetener and honey provided ad libitum to each panel member. Products were identified only as cereals "A" and "B". Cereal 1 was served first, followed by Cereal 2. Participants were asked to taste each cereal, waiting a minute or two between each cereal tasting to determine any aftertaste. Participants were instructed to rate each cereal in the categories of appearance, flavor, mouthfeel, aftertaste, texture and overall appeal. The rating scale ranged from +4 (like extremely) to −4 (dislike extremely). They also were urged to write comments pro or con and to state significant differences they sensed between the samples. Participants were observed throughout the test and verbal comments were noted.

As shown in Table 4, C. Cereal 2 was preferred over Cereal 1. Panel members were unanimous in favoring the texture of Cereal 2, and all members commented on the "mellow" flavor of Cereal 2. Other written comments noted the lack of "grainy" taste and the smoother consistency of Cereal 2. Panel members tried to determine what kind of grain was present in the cereals, and several thought it might be oat or a combination of oat and wheat.

TABLE 4

| Taste Comparison for Two Barley Hot Cereals | | |
|---|---|---|
| Category | Cereal 1 Rating* | Cereal 2 Rating* |
| Appearance | 2.3 | 2.7 |
| Flavor | 2.0 | 2.4 |
| Mouthfeel | 2.1 | 2.4 |
| Aftertaste | 1.8 | 2.3 |
| Overall Appeal | 2.0 | 2.6 |
| Texture (verbal comments) | 2.0 | 4.0 |
| Cumulative total | 11.9 | 16.4 |

*Ratings are averages of the individual scores for each category.

Example 3. Taste Comparison of Barley Hot Cereal and Other Hot Cereals

A taste test was carried out comparing (1) Cereal 2 described in Example 2 above; (2) Instant Malt-O-Meal (Malt-O-Meal Company, Minneapolis, Minn.; (3) Instant Cream of Wheat (Nabisco, East Hanover, N.J.), and 4) Instant Cream of Rice (Nabisco, East Hanover, N.J.). The test employed 22 people ranging in age from about 21 to about 60 years, including 4 tobacco users. Several of the participants opposed hot cereal in any form. Cereal 2 was cooked as described in Example 2 above. The other cereals were prepared according to the manufacturers directions. All cereals were served without milk, sweetener, or other enhancements. The taste test was run blind, with cereals identified only as "A", "B", "C" and "D". Participants were asked to compare the four cereals for appearance, flavor, mouthfeel, aftertaste and overall impression. Participants used a rating scale ranging from +4 to −4 for each category, with 0 being neutral, +4 being extreme like and −4 being extreme dislike.

The average score for the five categories was 2.8 for Cereal 2. The ranking of Cereal 2 was equal to the other cereals in all categories except flavor, in which the barley cereal ranking was higher than the rankings for Instant Cream of Wheat and Instant Cream of Rice. Several participants noted their preference for the texture of the barley cereal over the other cereals. Two testers noted a slight grainy aftertaste.

The foregoing detailed description has been provided for a better understanding of the invention only and no unnecessary limitation should be understood therefrom as some modifications will be apparent to those skilled in the art without deviating from the spirit and scope of the appended claims.

What is claimed is:

1. A method for producing a barley food ingredient, comprising the steps of:
    (a) pearling barley grain having a waxy phenotype;
    (b) contacting the pearled waxy barley grain with water until the moisture content of said waxy barley grain is between about 12 and about 16%, said contact achieving said moisture content of said waxy barley grain in less than about 5 hours at room temperature;
    (c) stabilizing the pearled waxy barley grain at a temperature of between about 235 and about 260 degrees Fahrenheit for a time between about 1 and about 7 minutes; and
    (d) thereafter forming the pearled waxy barley grain into a cereal ingredient.

2. The method of claim 1 wherein said barley grain has a waxy, hulless phenotype.

3. The method of claim 2 wherein said pearling step comprises removing between about 5 and about 10 weight percent of the grain.

4. The method of claim 1 wherein said barley grain has a waxy, hulled phenotype.

5. The method of claim 4 wherein said pearling step comprises removing between about 10 and about 15 weight percent of the grain.

6. The method of claim 1, wherein said contacting step comprises achieving said moisture content of about 12% to about 16% of said waxy barley grain in about 2 hours to about 3 hours at room temperature.

7. The method of claim 1 wherein said stabilizing step comprises heating said barley grain with an infrared heating apparatus.

8. The method of claim 7 wherein said infrared heating apparatus comprises a bulk material radiation processor.

9. The method of claim 8 wherein said stabilizing step comprises heating said barley grain to a temperature between about 235 and 245 degrees Fahrenheit for a time between about 1 and about 3 minutes.

10. The method of claim 1, wherein said forming step comprises rolling said waxy barley grain to an average thickness of between about 0.007 inches and about 0.030 inches.

11. The method of claim 1, wherein said forming step comprises puffing said waxy barley grain with a puffing gun.

12. The method of claim 10, wherein said rolling is carried out to an average thickness of between about 0.007 inches and about 0.012 inches.

13. The method of claim 10, wherein said rolling is carried out to an average thickness of between about 0.013 inches and about 0.024 inches.

14. The method of claim 10, wherein said rolling is carried out to an average-thickness of between about 0.025 inches and about 0.030 inches.

15. A barley food ingredient produced in accordance with the process of claim 1.

16. A barley food ingredient produced in accordance with the process of claim 6.

17. A barley food ingredient produced in accordance with the process of claim 9.

18. A barley food ingredient produced in accordance with the process claim 10.

19. A composition comprising the barley food ingredient of claim 15, and a food.

20. A composition comprising the barley food ingredient of claim 16, and a food.

21. A composition comprising the barley food ingredient of claim 17, and a food.

22. A composition comprising the barley food ingredient of claim 18, and a food.

* * * * *

REEXAMINATION CERTIFICATE (3998th)

United States Patent [19]
Alexander

[11] B1 5,360,619
[45] Certificate Issued Feb. 22, 2000

[54] CEREAL FOOD INGREDIENTS FROM WAXY BARLEY

[75] Inventor: Donald J. Alexander, Martin, N. Dak.

[73] Assignee: Alexander-Peterson Inc., Martin, N. Dak.

Reexamination Request:
No. 90/004,907, Feb. 2, 1998

Reexamination Certificate for:
Patent No.: 5,360,619
Issued: Nov. 1, 1994
Appl. No.: 08/131,100
Filed: Oct. 1, 1993

[51] Int. Cl.[7] ....................................................... A23L 1/00
[52] U.S. Cl. ........................... 426/242; 426/462; 426/507; 426/622
[58] Field of Search ..................................... 426/242, 462, 426/507, 520, 622, 483

[56] References Cited

U.S. PATENT DOCUMENTS

| | | | |
|---|---|---|---|
| 5,024,145 | 6/1991 | Bailey et al. | 99/451 |
| 5,082,680 | 1/1992 | Tkac | 426/483 |

FOREIGN PATENT DOCUMENTS

52377/90  11/1990  Australia .

OTHER PUBLICATIONS

N.L. Kent, M.A., Ph.D., "Technology of Cereals With a Reference to Wheat", pp. 204–205 (1996).

Hoseney, R., "Principles of Cereal Science and Technology", American Association of Cereal Chemists, Inc. pp. 42–51 (1986).

Matz, S., "Heat Transfer Mechanisms—Radiation", Cookie & Cracker Technology, Chapter 19:289–290 (1978).

Minifie, B., Chocolate Cocoa & Confectionary, pp. 713–714 (1980).

Matz, S., Snack Food Technology, pp. 232–233 (1984).

*Primary Examiner*—George C. Yeung

[57] ABSTRACT

Methods are disclosed for producing barley food ingredients, comprising the steps of pearling, tempering and stabilizing grain from barley lines having the waxy phenotype, and thereafter forming the grain into a cereal ingredient. Pearling the grain may comprise removing from about 5 weight percent to about 15 weight percent of the bran and germ. Tempering may comprise achieving a moisture content of about 12% to about 16% in about 2 to about 3 hours. Stabilizing the grain may comprise heating the grain in a bulk material radiation processor, preferably to a temperature between about 235 and 260 degrees Fahrenheit for a time between about 1 and about 7 minutes. Cereal ingredients may be formed by rolling the grain to flake thickness from about 0.007 to about 0.030 inches. Barley food ingredients and compositions are disclosed, including cereals and snack foods.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–22 are cancelled.

\* \* \* \* \*